United States Patent
Hisada et al.

(10) Patent No.: US 11,228,150 B2
(45) Date of Patent: Jan. 18, 2022

(54) CONNECTOR AND ELECTRONIC DEVICE

(71) Applicant: MITSUMI ELECTRIC CO., LTD., Tokyo (JP)

(72) Inventors: Shoichi Hisada, Tokyo (JP); Akihito Sukegawa, Tokyo (JP); Shinichi Tamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/021,777

(22) Filed: Sep. 15, 2020

(65) Prior Publication Data

US 2021/0104848 A1 Apr. 8, 2021

(30) Foreign Application Priority Data

Oct. 4, 2019 (JP) .............................. JP2019-184067

(51) Int. Cl.
| | |
|---|---|
| *H01R 24/52* | (2011.01) |
| *H01R 4/02* | (2006.01) |
| *H01R 13/6581* | (2011.01) |
| *H01R 103/00* | (2006.01) |

(52) U.S. Cl.
CPC ........... *H01R 24/525* (2013.01); *H01R 4/023* (2013.01); *H01R 13/6581* (2013.01); *H01R 2103/00* (2013.01)

(58) Field of Classification Search
CPC .. H01R 24/525; H01R 4/023; H01R 13/6581; H01R 2103/00
USPC ........................................................ 439/578
See application file for complete search history.

(56) References Cited

U.S. PATENT DOCUMENTS

| | | | | |
|---|---|---|---|---|
| 9,609,757 | B2* | 3/2017 | Steigerwald | H04N 5/2253 |
| 10,128,595 | B2* | 11/2018 | Conger | H04N 7/18 |
| 10,367,281 | B2* | 7/2019 | Conger | H01R 27/02 |
| 10,658,774 | B2* | 5/2020 | Conger | H01R 12/716 |
| 2014/0011399 | A1 | 1/2014 | Malek et al. | |
| 2015/0365569 | A1* | 12/2015 | Mai | H04N 5/2252 348/373 |
| 2016/0268716 | A1* | 9/2016 | Conger | H01R 12/716 |
| 2017/0201661 | A1* | 7/2017 | Conger | H01R 13/6582 |
| 2019/0081423 | A1* | 3/2019 | Conger | H01R 9/0518 |
| 2019/0143907 | A1 | 5/2019 | Byrne et al. | |
| 2019/0386413 | A1* | 12/2019 | Conger | H01R 27/02 |

FOREIGN PATENT DOCUMENTS

| | | |
|---|---|---|
| GN | 209389298 U | 9/2019 |
| JP | 2007022364 A | 2/2007 |
| JP | 2016162556 A | 9/2016 |

OTHER PUBLICATIONS

European Patent Office, Extended European Search Report Issued in Application No. 20196402.0, dated Nov. 6, 2020, Germany, 8 pages.

* cited by examiner

*Primary Examiner* — Peter G Leigh
(74) *Attorney, Agent, or Firm* — McCoy Russell LLP

(57) ABSTRACT

A connector 1 includes a connector housing 11, a thin wire coaxial cable 17 for providing a coaxial connection between an external coaxial cable 2 and a circuit board provided in a separated housing and a shield member 12 which is provided in an inner space of the connector housing 11 and electrically connected to a shell 173 of the thin wire coaxial cable 17. The shield member 12 has a holding mechanism for holding the thin wire coaxial cable 17.

7 Claims, 9 Drawing Sheets

CONNECTOR AND ELECTRONIC DEVICE

CROSS-REFERENCE TO RELATED APPLICATION

The present application claims priority to Japanese Patent Application No. 2019-184067 filed on Oct. 4, 2019. The entire contents of the above-listed application is hereby incorporated by reference for all purposes.

TECHNICAL FIELD

The present invention generally relates to connectors and electronic devices including the connector, in particular to a connector for providing a coaxial connection between a mating coaxial cable and a circuit board provided in a separated housing, and an electronic device including the connector.

BACKGROUND

Conventionally, in order to provide an electrical connection between a circuit board provided in a housing and an external cable, there has been used a connector having a connector housing separated from the housing containing the circuit board. Examples of a typical device for which such a connector is used contain a vehicle-mounted camera.

The vehicle-mounted camera usually includes a camera housing, a circuit board provided in the camera housing, an image sensor such as a CCD or a CMOS sensor mounted on the circuit board and an imaging optical system provided in front of the image sensor. An optical image is formed on an imaging surface of the image sensor by the imaging optical system and the image sensor captures the optical image to perform a capturing operation of the vehicle-mounted camera. This vehicle-mounted camera can be attached to various locations (e.g., a front bumper and a rear bumper) of a vehicle and connected to an ECU (Electronic Control Unit) for controlling operations of the vehicle to transmit a captured image to the ECU and receive electric power and instructions from the ECU.

In order to connect the vehicle-mounted camera and the ECU, it is necessary to connect a connection cable extending from the ECU to a connection portion of the circuit board of the vehicle-mounted camera. At this time, in order to realize a required environmental resistance performance of the vehicle-mounted camera such as improvement of noise resistance performance due to an EMI shield, improvement of reliability of the connection, waterproofing and dust-proofing of the connection and improvement of impact resistance performance, there has been often used a connector for relaying the connection between the connection portion of the circuit board of the vehicle-mounted camera and the connection cable of the ECU.

Further, as the number of pixels of the vehicle-mounted camera has increased in recent years, an amount of data transmitted from the vehicle-mounted camera to the ECU has also increased. In order to transmit a large amount of data in a short time, it is necessary to exchange a high frequency signal between the vehicle-mounted camera and the ECU. Thus, there are needs for improving electrical characteristics of the connection between the vehicle-mounted camera and the ECU. In particular, there are needs for improving transmission performance of the connection in a high frequency band. In response to such needs, patent document 1 discloses a connector which uses a coaxial cable as a connection cable of the vehicle-mounted camera and connects the vehicle-mounted camera and the ECU with a coaxial connection. As is well known in the art, a coaxial connection using a coaxial cable has higher transmission performance in a high frequency band as compared with a connection using a plurality of terminals. By connecting the vehicle-mounted camera and the ECU with the coaxial connection using the coaxial cable, it is possible to improve the transmission performance of the connection between the vehicle-mounted camera and the ECU in the high frequency band.

In the case of utilizing the connector for connecting the connection portion of the circuit board of the vehicle-mounted camera and the connection cable of the ECU, a thin wire cable is often used for connecting the circuit board of the vehicle-mounted camera and the connector. For example, patent document 2 discloses a connector 700 shown in FIG. 1. The connector 700 is used for providing a connection between an external cable 800 extending from an ECU of a vehicle and a circuit board 920 provided in a camera housing 910 of a vehicle-mounted camera 900. The connector 700 includes a box-like connector housing 710 opening toward the front side (the side of the vehicle-mounted camera 900), a wiring board 720 provided in the connector housing 710, terminals 730 for providing a connection between the wiring board 720 and the external cable 800 and a thin wire cable 740 for providing a connection between the wiring board 720 and the circuit board 920 of the vehicle-mounted camera 900. An engaging portion 750 is formed on a rear surface side of the connector housing 710. The external cable 800 is engaged with the engaging portion 750 of the connector housing 710. Further, by attaching the front side (the side of vehicle-mounted camera 900) of the connector housing 710 to the rear side of the camera housing 910, components of the connector 700 and the circuit board 920 of the vehicle-mounted camera 900 are contained in a space defined by the front side of the connector housing 710 and the rear side of the camera housing 910.

When the external cable 800 is engaged with the engaging portion 750 of the connector housing 710, the terminals 730 of the connector 700 are electrically connected to the external cable 800 and thus the wiring board 720 of the connector 700 is electrically connected to the external cable 800. On the other hand, the thin wire cable 740 connects the wiring board 720 of the connector 700 and the circuit board 920 of the vehicle-mounted camera 900. With this configuration, the connector 700 can provide a connection between the external cable 800 and the circuit board 920 of the vehicle-mounted camera 900 contained in the camera housing 910 separated from the connector housing 710 of the connector 700.

Since the connection between the wiring board 720 of the connector 700 and the circuit board 920 of the vehicle-mounted camera 900 through the thin wire cable 740 has a simple configuration and can be manually provided with ease, the connection using the thin wire cable 740 has been widely used. However, in the case of using the connection with the thin wire cable 740, there is a problem that the thin wire cable 740 is disengaged from the wiring board 720 of the connector 700 and/or the circuit board 920 of the vehicle-mounted camera 900 when vibration or impact is applied to the connector 700 during driving of the vehicle and thus the thin wire cable 740 is severely swung. As a result, the connection between the wiring board 720 of the connector 700 and the circuit board 920 of the vehicle-mounted camera 900 of the connector 700 is unintentionally disengaged.

RELATED ART DOCUMENTS

Patent Documents

JP 2016-162556A
JP 2007-22364A

SUMMARY

Problem to be Solved by the Invention

The present invention has been made in view of the problem of the conventional arts mentioned above. Accordingly, an object of the present invention is to provide a connector which can prevent unintentional disengagement of a connection between a circuit board provided in a separated housing and a thin wire coaxial cable, and an electronic device including the connector.

Means for Solving the Problems

The above object is achieved by the present inventions defined in the following (1) to (8).

(1) A connector for providing a coaxial connection between an external coaxial cable and a circuit board provided in a separated housing located on a front side of the connector, comprising:

a box-like connector housing to be attached to the separated housing located on the front side of the connector, the connector housing including a rear plate, a wall portion extending from an outer edge of the rear plate toward the front side and an engaging portion which is formed on a rear side surface of the rear plate and should be engaged with the external coaxial cable;

a thin wire coaxial cable for providing the coaxial connection between the external coaxial cable engaged with the engaging portion of the connector housing and the circuit board provided in the separated housing, the thin wire coaxial cable including a core wire and a metal shell provided concentrically with the core wire; and a shield member which is provided in an inner space of the connector housing defined by the rear plate and the wall portion of the connector housing and electrically connected to the shell of the thin wire coaxial cable, wherein the shield member has a holding mechanism for holding the thin wire coaxial cable.

(2) The connector according to the above (1), wherein the thin wire coaxial cable has an attachment portion electrically connected to the shell, and wherein the shield member is electrically connected to the shell of the thin wire coaxial cable when the attachment portion of the thin wire coaxial cable is held by the holding mechanism of the shield member.

(3) The connector according to the above (1) or (2), wherein the shield member has a flat plate-like main body portion located on the rear plate in the internal space of the connector housing and the holding mechanism formed integrally with the main body portion.

(4) The connector according to the above (3), wherein the holding mechanism includes a pair of extending portions formed by bending a part of the main body portion toward the front side, and wherein the holding mechanism holds the thin wire coaxial cable by clamping the attachment portion of the thin wire coaxial cable with the pair of extending portions.

(5) The connector according to any one of the above (1) to (4), further comprising a contact pin for connecting the external coaxial cable and the core wire of the thin wire coaxial cable, wherein the core wire of the thin wire coaxial cable is soldered to the contact pin.

(6) The connector according to the above (5), wherein the contact pin is passed through the rear plate of the connector housing so that one end portion of the contact pin is located on the front side of the rear plate and the other end portion of the contact pin is located on a rear side of the rear plate, and wherein the one end portion of the contact pin is soldered to the core wire of the thin wire coaxial cable and the other end portion of the contact pin should be connected to the external coaxial cable.

(7) The connector according to the above (6), wherein a connection portion between the one end portion of the contact pin and the core wire of the thin wire coaxial cable is covered by an insulating protective member.

(8) An electronic device comprising:

the connector defined by any one of the above (1) to (7); and the circuit board provided in the separated housing separated from the connector housing of the connector and connected to the connector.

Effects of the Invention

According to the present invention, since the thin wire coaxial cable is held by the holding mechanism of the shield member, it is possible to prevent swing of the thin wire coaxial cable due to vibration, impact or the like during driving of a vehicle. Therefore, it is possible to prevent the connection between the thin wire coaxial cable and the circuit board provided in the separated housing from being unintentionally disengaged by the swing of the thin wire coaxial cable and thus it is possible to improve reliability of the connection between the thin wire coaxial cable and the circuit board provided in the separated housing.

DETAILED DESCRIPTION

Figure 1:
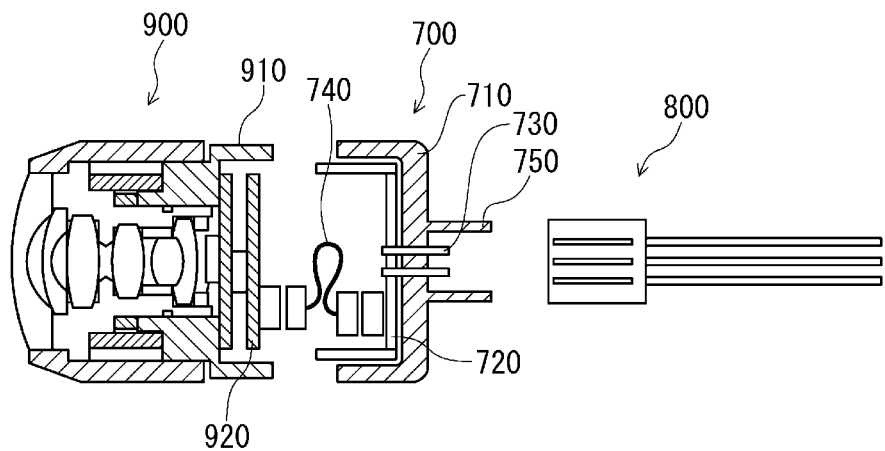
FIG. 1 is a cross-sectional view for explaining a conventional connector.

Hereinafter, a connector and an electronic device of the present invention will be described based on a preferred embodiment shown in the accompanying drawings. Note that each of the drawing referred in the following description is a schematic diagram prepared for explaining the present invention. A dimension (such as a length, a width and a thickness) of each component shown in the drawings is not necessarily identical to an actual dimension. Further, the same reference numbers are used throughout the drawings to refer to the same or like elements. Hereinafter, a positive direction of the Z-axis in each figure is referred to as "a front side", a negative direction of the Z-axis in each figure is referred to as "a rear side", a positive direction of the Y-axis in each figure is referred to as "an upper side", a negative direction of the Y-axis in each figure is referred to as "a lower side", a positive direction of the X-axis in each figure is referred to as "a near side" and a negative direction of the X-axis in each figure is referred to as "a far side".

Figure 2:
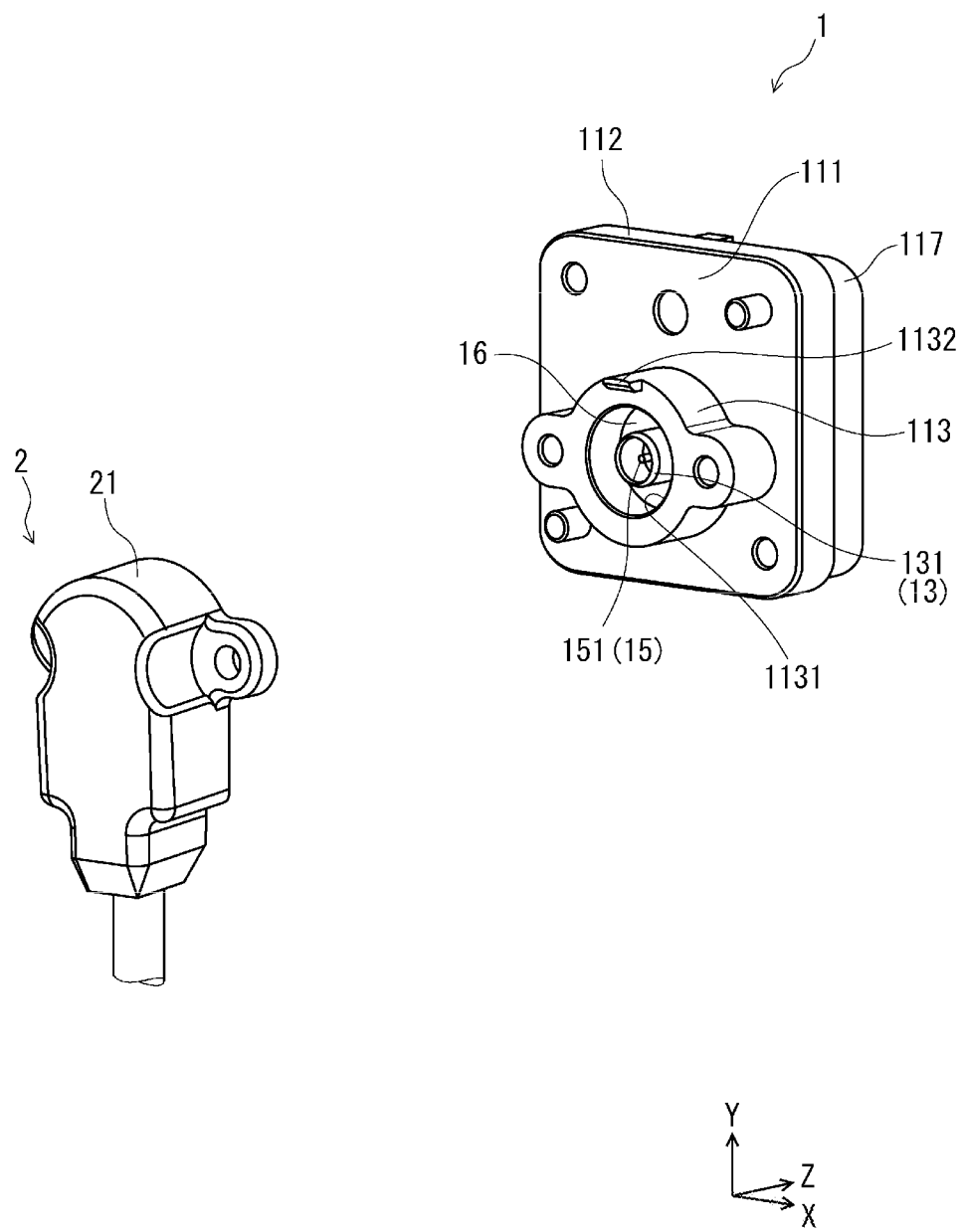
FIG. 2 is a perspective view showing a connector according to the present invention and an external coaxial cable.
Figure 3:
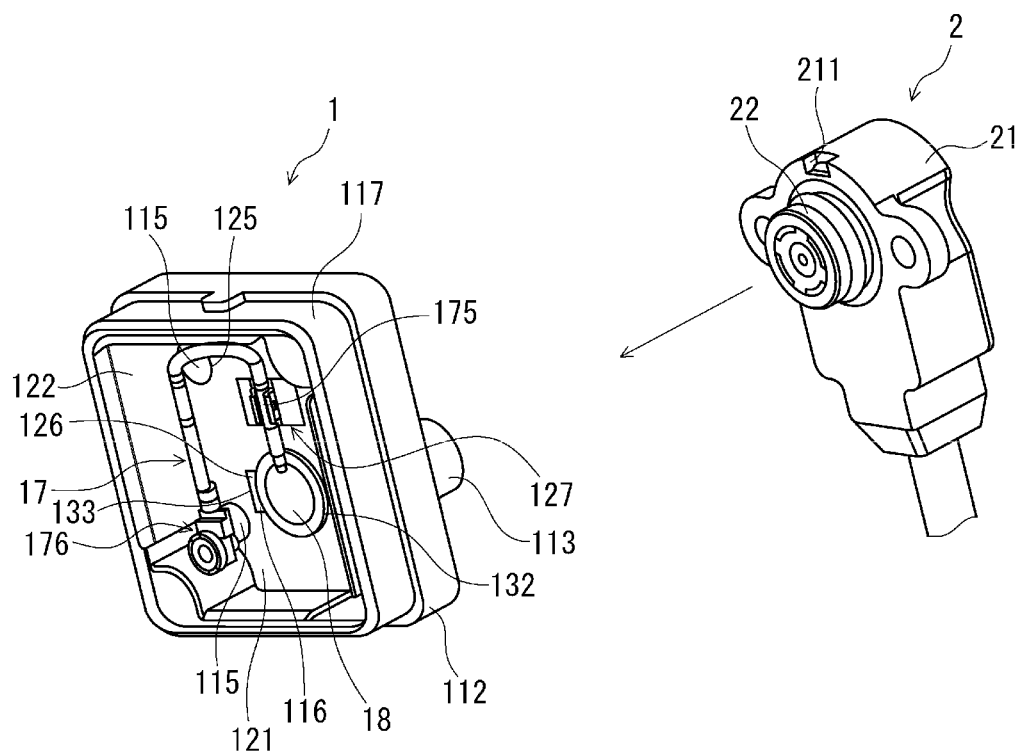
FIG. 3 is a perspective view showing the connector and the external coaxial cable shown in FIG. 2 from another angle.
Figure 3:
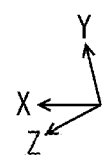
Figure 4:
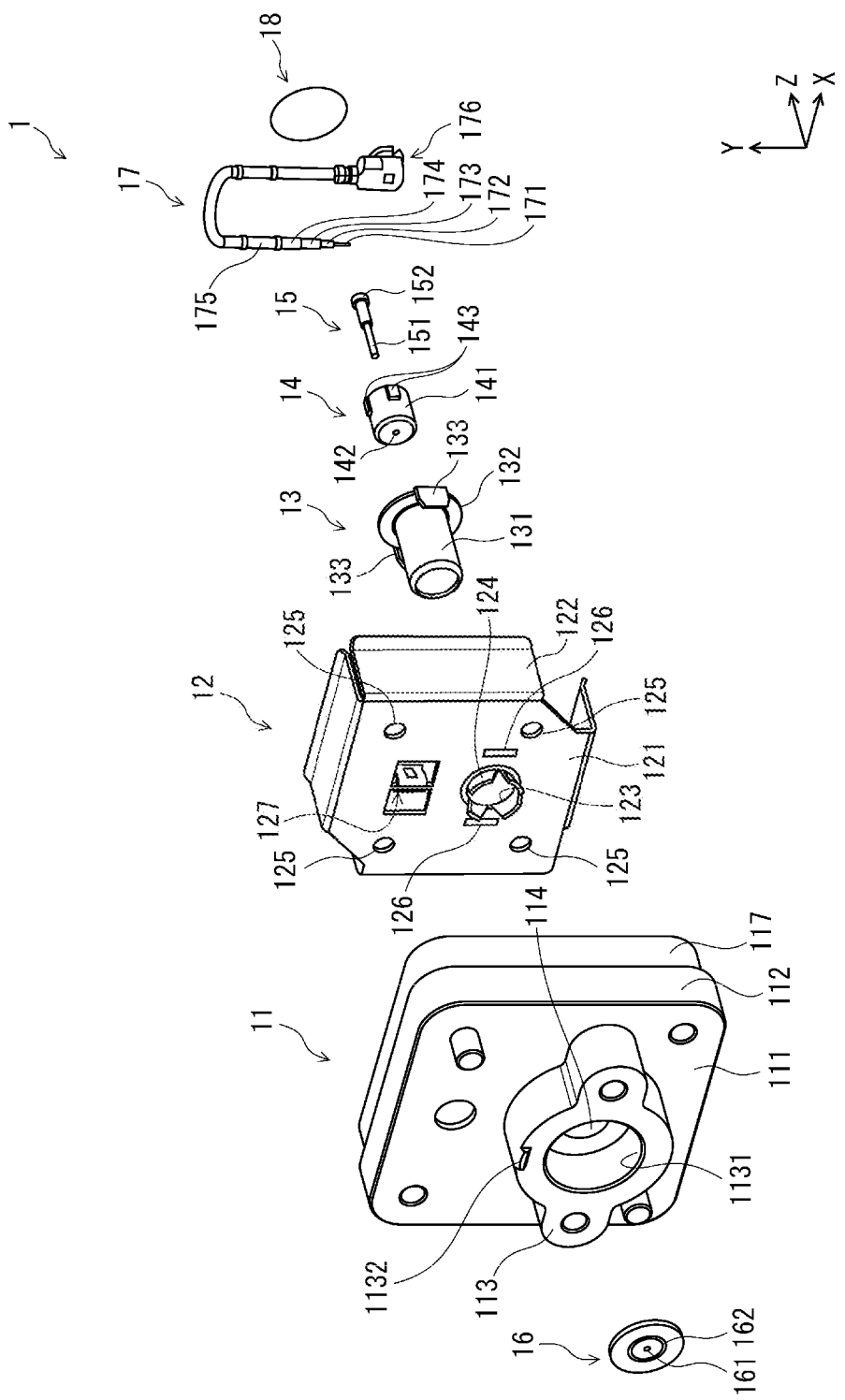
FIG. 4 is an exploded perspective view of the connector shown in FIG. 2.
Figure 5:
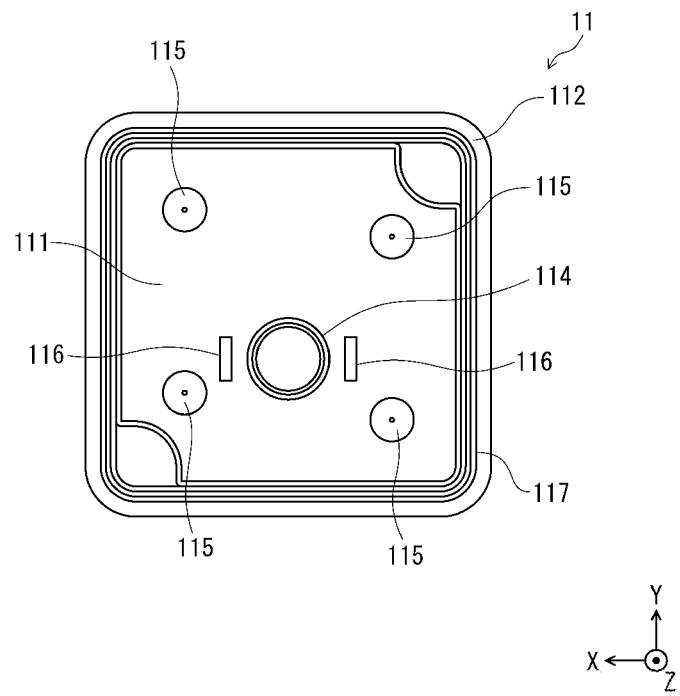
FIG. 5 is a planar view of a connector housing shown in FIG. 4 viewed from the front side.
Figure 6:
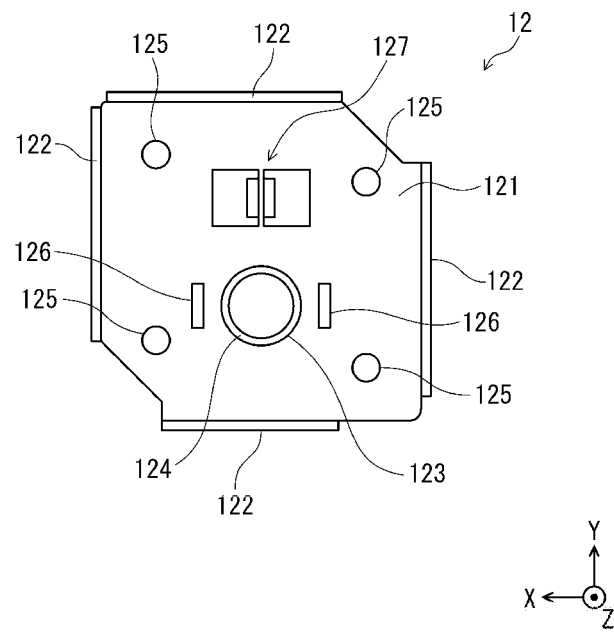
FIG. 6 is a planar view of a shield member shown in FIG. 4 viewed from the front side.
Figure 7:
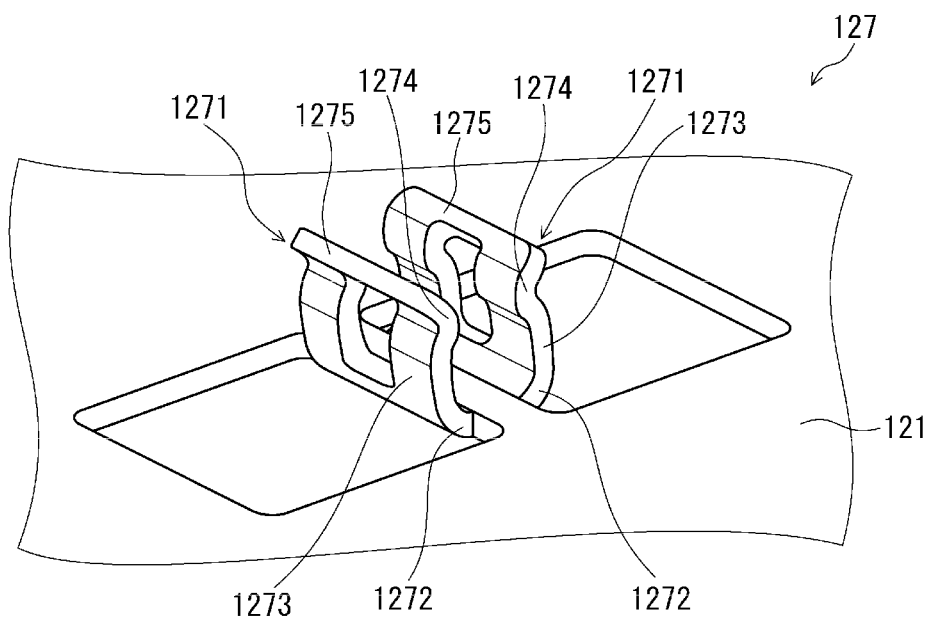
FIG. 7 is a perspective view showing an enlarged peripheral area of a holding mechanism of the shield member shown in FIG. 6.
Figure 7:
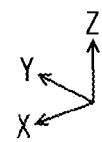
Figure 8:
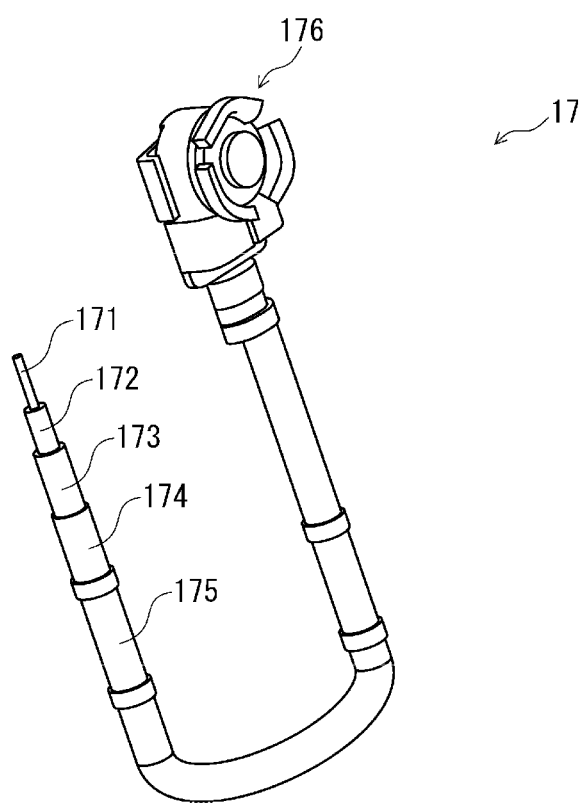
FIG. 8 is a perspective view showing a thin wire coaxial cable shown in FIG. 4.
Figure 9:
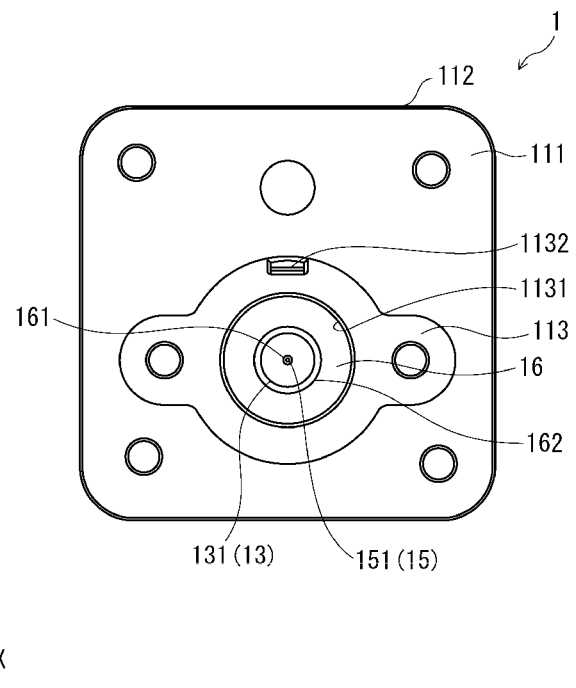
FIG. 9 is a planar view of the connector shown in FIG. 2 viewed from the rear side.
Figure 10:
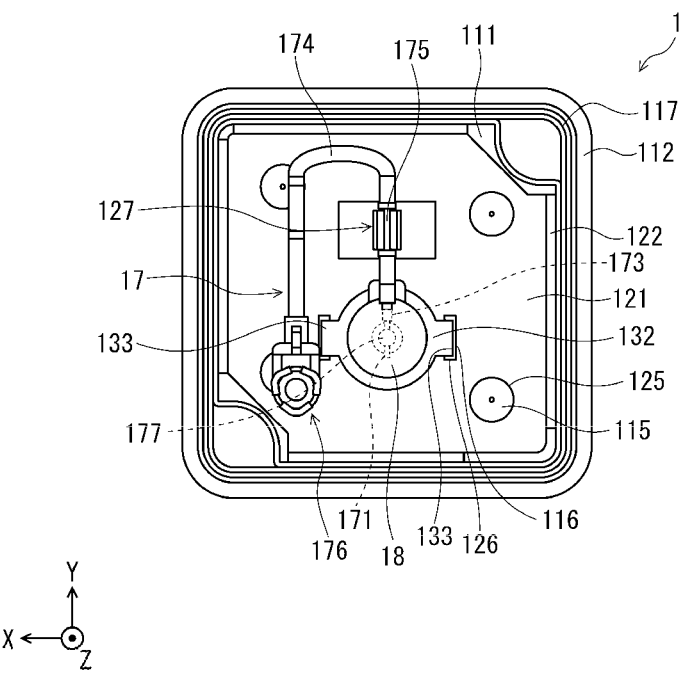
FIG. 10 is a planar view of the connector shown in FIG. 2 viewed from the front side.
Figure 11:
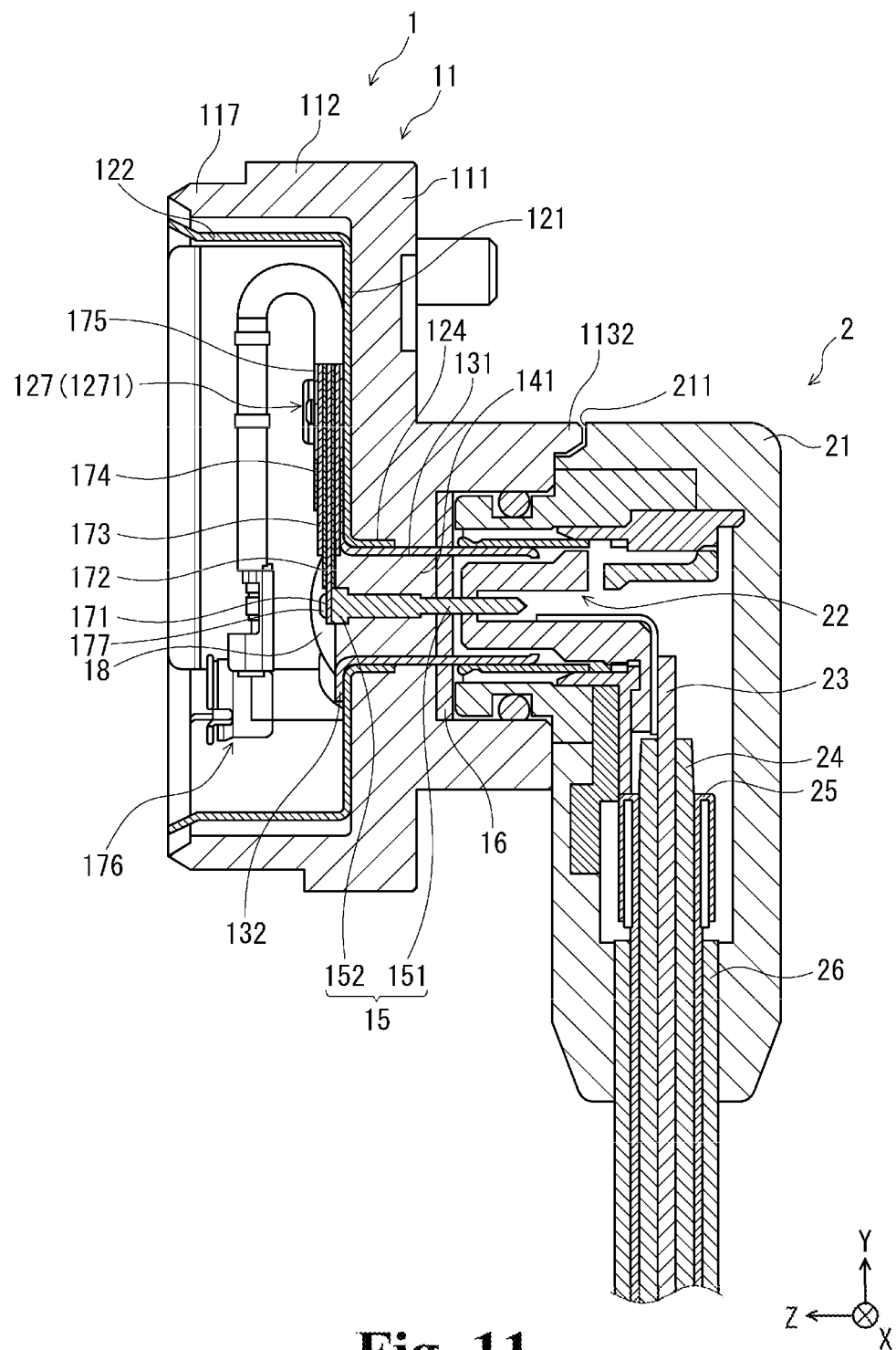
FIG. 11 is a cross-sectional view in the Y-Z plane for explaining a connection between the connector and the external coaxial cable shown in FIG. 2.

First, a connector according to an embodiment of the present invention will be described in detail with reference to FIGS. 2 to 11. FIG. 2 is a perspective view showing the connector according to the present invention and an external coaxial cable. FIG. 3 is a perspective view showing the connector and the external coaxial cable shown in FIG. 2 from another angle. FIG. 4 is an exploded perspective view of the connector shown in FIG. 2. FIG. 5 is a planar view of a connector housing shown in FIG. 4 viewed from the front side. FIG. 6 is a planar view of a shield member shown in FIG. 4 viewed from the front side. FIG. 7 is a perspective view showing an enlarged peripheral area of a holding mechanism of the shield member shown in FIG. 6. FIG. 8 is a perspective view showing a thin wire coaxial cable shown in FIG. 4. FIG. 9 is a planar view of the connector shown in FIG. 2 viewed from the rear side. FIG. 10 is a planar view of the connector shown in FIG. 2 viewed from the front side. FIG. 11 is a cross-sectional view in the Y-Z plane for explaining a connection between the connector and the external coaxial cable shown in FIG. 2.

FIGS. 2 and 3 show a connector 1 according to the present embodiment of the present invention and an external coaxial cable 2 to be connected to the connector 1. The connector 1 is used for providing a coaxial connection between the external coaxial cable 2 and a circuit board of an external device provided in a separated housing (not shown).

Typically, the external device (not shown) to be coaxially connected to the external coaxial cable 2 through the connector 1 is a vehicle-mounted camera. For example, the vehicle-mounted camera is provided at various locations of the vehicle (e.g., a front bumper and a rear bumper) to capture an outside of the vehicle and transmit a captured image to a control device of the vehicle such as an ECU (Electronic Control Unit). The external coaxial cable 2 extends from the control device of the vehicle such as the ECU and is coaxially connected to the circuit board of the external device through the connector 1.

As shown in FIG. 4, the connector 1 includes a box-like connector housing 11 opening toward the front side (the +Z direction side), a shield member 12 provided in the connector housing 11, a cylindrical metal shell 13 passing through the connector housing 11 and the shield member 12 from the front side (the +Z direction side) toward the rear side (the −Z direction side), a cylindrical insulating housing 14 provided in the shell 13, a contact pin 15 held by the housing 14 so that a tip end portion 151 of the contact pin 15 is exposed on the rear side (the −Z direction side) of the connector housing 11 and a base end portion 152 of the contact pin 15 is exposed on the front side (the +Z direction side) of the connector housing 11, a sealing member 16 for liquid-tightly sealing the connector housing 11, a thin wire coaxial cable 17 for providing a coaxial connection between the external coaxial cable 2 and the circuit board of the external device provided in the separated housing through the contact pin 15 and a protective member 18 for protecting a connection between the contact pin 15 and the thin wire coaxial cable 17.

The connector housing 11 is formed with an insulating material and parts of the connector housing 11 are integrated with each other. The connector housing 11 has a function of containing components of the connector 1 therein. As shown in FIGS. 4 and 5, the connector housing 11 includes a rear plate 111 facing the external coaxial cable 2, a wall portion 112 extending from an outer edge of the rear plate 111 toward the front side (the +Z direction side), an engaging portion 113 formed on a rear side (−Z direction side) surface of the rear plate 111, a through-hole 114 formed in the rear plate 111, four bosses 115 formed on a front side (+Z direction side) surface of the rear plate 111 and a pair of press-fitting grooves 116 formed on the front side (the +Z direction side) surface of the rear plate 111 so as to position the through-hole 114 therebetween.

The rear plate 111 is a flat plate member having a substantially square shape in a planar view. The rear plate 111 serves as a base of the connector 1. When the external coaxial cable 2 is connected to the connector 1, the external coaxial cable 2 faces the rear plate 111. The wall portion 112 extends from the outer edge of the rear plate 111 toward the front side (the +Z direction side). An inner space of the connector housing 11 is defined by the front side (the +Z direction side) surface of the rear plate 111 and the wall portion 112 and the components of the connector 1 are contained in the inner space of the connector housing 11. Further, an engaging portion 117 whose outer diameter is reduced is formed at a front side (+Z direction side) portion of the wall portion 112. By engaging the engaging portion 117 of the wall portion 112 with a corresponding opening of the housing of the external device located on the front side (the +Z direction side), the connector 1 can be attached to the external device.

The engaging portion 113 is a portion which protrudes from the rear side (the −Z direction side) surface of the rear plate 111 toward the rear side and to which a connector portion 21 (see FIG. 3) of the external coaxial cable 2 should be attached. The engaging portion 113 includes an opening 1131 having a larger diameter than a diameter of the through-hole 114 formed in the rear plate 111 and formed so as to be concentric with the through-hole 114 and an engaging convex portion 1132 formed on an upper end portion of the opening 1131. As shown in FIG. 3, by contacting the external coaxial cable 2 with the engaging portion 113 so that a front side (+Z direction side) surface of the connector portion 21 of the external coaxial cable 2 faces the engaging portion 113 and inserting the engaging convex portion 1132 of the engaging portion 113 of the connector 1 into an engaging concave portion 221 formed on the connector portion 21 of the external coaxial cable 2, the external coaxial cable 2 is engaged with the engaging portion 113. When the external coaxial cable 2 is engaged with the engaging portion 113, a terminal portion 22 of the external coaxial cable 2 contacts with the shell 13 and the contact pin 15 of the connector 1 and thus the connector 1 is coaxially connected to the external coaxial cable 2.

Referring back to FIG. 5, the through-hole 114 is formed for allowing the shell 13, the housing 14 and the contact pin 15 to pass through the rear plate 111 from the front side (the +Z direction side) toward the rear side (the −Z direction side). The four bosses 115 are formed on the front side (the +Z direction side) surface of the rear plate 111. The four bosses 115 are used for holding the shield member 12 in the inner space of the connector housing 11 defined by the rear plate 111 and the wall portion 112. The pair of press-fitting grooves 116 are formed on the front side (the +Z direction side) surface of the rear plate 111 so as to position the through-hole 114 therebetween. By respectively press-fitting a pair of protruding portions 133 (see FIG. 4) of the shell 13 into the pair of press-fitting grooves 116, the shell 13 is fixed to the connector housing 11.

The shield member 12 is formed with a metal material and fixedly provided in the connector housing 11. The shield member 12 has a function of providing an EMI shield for improving a noise resistance performance of the connection between the external coaxial cable 2 and the circuit board of the external device provided in the separated housing through the connector 1. The shield member 12 can be formed by performing a punching process and a bending process on a single flat metal plate. As shown in FIGS. 4 and 6, the shield member 12 includes a flat plate portion 121 provided on the front side (the +Z direction side) surface of the rear plate 111, a wall portion 122 extending from an outer edge of the flat plate portion 121 to the front side (+Z direction side), a through-hole 123 formed in the flat plate portion 121 so as to correspond to the through-hole 114 of the connector housing 11, extending portions 124 extending from an edge of the through-hole 123 toward the rear side (the −Z direction side), boss insertion holes 125 formed in the flat plate portion 121 so as to respectively correspond to the four bosses 115 of the connector housing 11, a pair of slits 126 formed in the flat plate portion 121 so as to respectively correspond to the pair of press-fitting grooves 116 of the connector housing 11 and a holding mechanism 127 for holding the thin wire coaxial cable 17.

The flat plate portion 121 is provided on the surface of the front side (the +Z direction side) surface of the rear plate 111. An upper right corner portion and a lower left corner portion of the flat plate portion 121 are cut out as shown in FIG. 6 and the flat plate portion 121 has a shape corresponding to the front side (the +Z direction side) surface of the rear plate 111. Therefore, the flat plate portion 121 is fitted to the front side (the +Z direction side) surface of the rear plate 111. The wall portion 122 extends toward the front side (the +Z direction side) from the outer edge of the flat plate portion 121 except the cutout portions of the flat plate portion 121 toward the front side (the +Z direction side). An outer shape of the wall portion 122 is substantially equal to an inner shape of the wall portion 112 of the connector housing 11. Thus, the wall portion 122 of the shield member 12 fits an inner surface of the wall portion 112 of the connector housing 11.

The through-hole 123 is formed in the flat plate portion 121 so as to correspond to the through-hole 114 of the connector housing 11 when the shield member 12 is fixed in the inner space of the connector housing 11. Further, the extending portions 124 are formed so as to extend from the edge portion of the through-hole 123 toward the rear side (the −Z direction side). When the shield member 12 is fixed in the inner space of the connector housing 11, the extending portions 124 abut against an inner surface of the through-hole 114 of the connector housing 11.

The four boss insertion holes 125 are formed in the flat plate portion 121 so as to respectively correspond to the four bosses 115 of the connector housing 11 when the shield member 12 is fixed in the inner space of the connector housing 11. By pressing the shield member 12 onto the connector housing 11 from the front side (the +Z direction side), the four bosses 115 of the connector housing 11 are respectively press-fitted into the four boss insertion holes 125 of the shield member 12 and thus the shield member 12 is fixed in the inner space of the connector housing 11.

The pair of slits 126 are formed in the flat plate portion 121 so as to respectively correspond to the pair of press-fitting grooves 116 of the connector housing 11 when the shield member 12 is fixed in the inner space of the connector housing 11. When the pair of protruding portions 133 of the shell 13 are respectively press-fitted into the pair of press-fitting grooves 116 of the connector housing 11 through the pair of slits 126 of the shield member 12, the shell 13 is fixed to the connector housing 11.

The holding mechanism 127 has a function of holding the thin wire coaxial cable 17. FIG. 7 shows an enlarged view of a peripheral area of the holding mechanism 127. As shown in FIG. 7, the holding mechanism 127 is constituted of a pair of clamping portions 1271 formed by bending a part of the flat plate portion 121 toward the front side (the +Z direction side). Each of the pair of clamping portions 1271 includes a base end portion 1272 integrated with the flat plate portion 121, an extending portion 1273 extending from the base end portion 1272 toward the front side (the +Z direction side), a reduced diameter portion 1274 formed at a front end of the extending portion 1273 and a guide portion 1275 formed at a front end of the reduced diameter portion 1274.

Each of the pair of clamping portions 1271 extends from the flat plate portion 121 toward the front side (the +Z direction side). A separation distance between the reduced diameter portions 1274 of the pair of clamping portions 1271 is smaller than a diameter of an attachment portion 175 (see FIG. 8) of the thin wire coaxial cable 17 described later. A separation distance between the base end portions 1272 of the pair of clamping portions 1271 is approximately equal to the diameter of the attachment portion 175 of the thin wire coaxial cable 17. Further, a separation distance between the guide portions 1275 of the pair of clamping portions 1271 is larger than the separation distance between the reduced diameter portions 1274 of the pair of clamping portions 1271.

By pressing the attachment portion 175 of the thin wire coaxial cable 17 into a space between the guide portions 1275 of the pair of clamping portions 1271, the attachment portion 175 of the thin wire coaxial cable 17 is clamped between the base end portions 1272 of the pair of clamping portions 1271. At this time, since the separation distance between the reduced diameter portions 1274 of the pair of clamping portions 1271 is smaller than the diameter of the attachment portion 175 of the thin wire coaxial cable 17, the attachment portion 175 of the thin wire coaxial cable 17 is locked by the pair of clamping portions 1271. With this configuration, it is possible to hold the thin wire coaxial cable 17 with the holding mechanism 127. Since the thin wire coaxial cable 17 is held by the holding mechanism 127 as described above, it is possible to prevent the swing of the thin wire coaxial cable 17 when vibration or impact is applied to the connector 1.

Referring back to FIG. 4, the shell 13 is a hollow cylindrical member formed with a metal material. The shell 13 is electrically connected to a shell 25 (see FIG. 11) of the external coaxial cable 2 when the external coaxial cable 2 is connected to the connector 1. The shell 13 includes a cylindrical main body portion 131, a flange portion 132 formed at a front side (+Z direction side) end portion of the main body portion 131 and the pair of protruding portions 133 protruding from an outer edge of the flange portion 132 toward the rear side (the −Z direction side).

The main body portion 131 is passed through the through-hole 123 of the shield member 12 and the through-hole 114 of the connector housing 11 from the front side (the +Z direction side) of the rear plate 111 of the connector housing 11. A tip end portion of the main body portion 131 protrudes from the through-hole 114 of the rear plate 111 toward the rear side (the −Z direction side) and located in the opening 1131 of the engaging portion 113 of the connector housing 11. At this time, an outer periphery of the main body portion 131 contacts with the extending portions 124 of the shield member 12.

The flange portion 132 radially extends from a base end portion of the main body portion 131. When the main body portion 131 is passed through the through-hole 123 of the shield member 12 and the through-hole 114 of the connector housing 11, the flange portion 132 abuts the flat plate portion 121 of the shield member 12. With this configuration, it is possible to prevent the shell 13 from removing toward the rear side (the −Z direction side) through the through-hole 123 of the shield member 12 and the through-hole 114 of the connector housing. Further, as shown in FIG. 11, the flange portion 132 contacts with a metal shell 173 of the thin wire coaxial cable 17 in the state that the connector 1 is assembled. With this configuration, the shell 173 of thin wire coaxial cable 17 is electrically connected to the shield member 12 through the shell 13.

The pair of protruding portions 133 extend from the outer edge of the flange portion 132 toward the rear side (the −Z direction side). When the main body portion 131 is passed through the through-hole 123 of the shield member 12 and the through-hole 114 of the connector housing 11, the pair of protruding portions 133 are respectively press-fitted into the pair of press-fitting grooves 116 of the connector housing 11 through the pair of slits 126 of the shield member 12. With this configuration, the shell 13 is fixed to the connector housing 11.

The housing 14 is provided in the shell 13. The housing 14 has a function of holding the contact pin 15 in the shell 13 in a state that the shell 13 and the contact pin 15 are insulated from each other. The housing 14 is a cylindrical member formed with an insulating material. The housing 14 is held in the shell 13 when the housing 14 is press-fitted into the shell 13. The housing 14 includes a cylindrical main body portion 141, a through-hole 142 formed in a center of the main body portion 141 and a plurality of protrusions 143 formed on a base end portion of an outer periphery of the main body portion 141. By press-fitting the housing 14 into the shell 13 so that the plurality of protrusions 143 are compressively deformed, the housing 14 is fixed in the shell 13.

The through-hole 142 is formed for allowing the contact pin 15 to pass through the housing 14. The contact pin 15 is passed through the through-hole 142 so that a tip end portion 151 of the contact pin 15 is exposed on the rear side (the −Z direction side) of the main body portion 141 of the housing 14 and a base end portion 152 of the contact pin 15 is exposed on the front side (the +Z direction side) of the main body portion 141 of the housing 14.

The contact pin 15 is a rod-like member formed with a metal material. The contact pin 15 is passed through the through-hole 142 of the housing 14 provided in the shell 13. The contact pin 15 is electrically connected to a core wire 23 (see FIG. 11) of the external coaxial cable 2 when the external coaxial cable 2 is connected to the connector 1. The contact pin 15 has the tip end portion 151 and the base end portion 152. The tip end portion 151 is exposed on the rear side (the −Z direction side) of the rear plate 111 of the connector housing 11 through the through-hole 142 of the housing 14 in the main body portion 131 of the shell 13 through the through-hole 142 of the housing 14. On the other hand, the base end portion 152 is exposed on the front side (the +Z direction side) of the rear plate 111 of the connector housing 11. A diameter of the tip end portion 151 is substantially equal to a diameter of the through-hole 142 of the housing 14 and a diameter of the base end portion 152 is larger than the diameter of the through-hole 142 of the housing 14. Thus, it is possible to prevent the contact pin 15 from removing from the through-hole 142 of the housing 14 toward the rear side (the −Z direction side).

The tip end portion 151 of the contact pin 15 contacts with the terminal portion 22 of the external coaxial cable 2 in a state that the external coaxial cable 2 is attached to the connector 1 and thus the contact pin 15 is electrically connected to the core wire 23 (see FIG. 11) of the external coaxial cable 2. On the other hand, the base end portion 152 of the contact pin 15 is electrically connected to the core wire 171 (see FIG. 11) of the thin wire coaxial cable 17. Thus, the contact pin 15 connects the external coaxial cable 2 and the thin wire coaxial cable 17. As described above, since the contact pin 15 is passed through the through-hole 142 of the housing 14 provided in the shell 13, the shell 13, the housing 14 and the contact pin 15 constitute a coaxial cable structure.

The sealing member 16 has a function of liquid-tightly sealing the connector housing 11 from the rear side (the −Z direction side). The sealing member 16 is a disk-like member formed with an insulating material. The sealing member 16 includes a through-hole 161 formed at a center thereof and a circular slit 162 concentric with the through-hole 161. The sealing member 16 is inserted into the opening 1131 of the engaging portion 113 of the connector housing 11 from the rear side (the −Z direction side) of the rear plate 111. The contact pin 15 is passed through the through-hole 161 and the main body portion 131 of the shell 13 is passed through the circular slit 162. With this sealing member 16, a water penetrating path in the opening 1131 of the engaging portion 113 of the connector housing 11 from the rear side (the −Z direction side) toward the front side (the +Z direction side) is blocked. Thus, the opening 1131 of the connector housing 11 is liquid-tightly sealed.

The thin wire coaxial cable 17 has a function of providing the coaxial connection between the external coaxial cable 2 and the circuit board of the external device provided in the separated housing. As shown in FIG. 8, the thin wire coaxial cable 17 includes the core wire 171, an inner insulating layer 172 covering an outer surface of the core wire 171, the metal shell 173 covering an outer surface of the inner insulating layer 172, an outer insulating layer 174 covering an outer surface of the shell 173, the attachment portion 175 held by the holding mechanism 127 of the shield member 12 and a connector 176 attached to one end portion of the core wire 171.

The core wire 171 is a wiring formed with a metal material having a high conductivity such as copper. The one end portion of the core wire 171 is connected to the connector 176 and the other end portion is soldered to the base end portion 152 of the contact pin 15 by a solder portion 177 (see FIGS. 10 and 11). The inner insulating layer 172 is formed with an insulating material and is provided so as to cover the outer surface of the core wire 171. The shell 173 is a cylindrical member formed with a metal material and is provided so as to cover the outer surface of the inner insulating layer 172. The outer insulating layer 174 is formed with an insulating material and is provided to cover the outer surface of the shell 173. Thus, the core wire 171, the inner insulating layer 172 and the shell 173 constitute a coaxial cable structure.

The attachment portion 175 is a cylindrical member formed with a metal material and provided on the outer surface of the shell 173. In the thin wire coaxial cable 17, the outer insulating layer 174 is omitted at a portion where the attachment portion 175 is formed and the attachment portion 175 and the shell 173 contact with each other at this portion. Namely, the attachment portion 175 is electrically connected to the shell 173. Since the base end portions 1272 of the pair of clamping portions 1271 of the holding mechanism 127 of the shield member 12 are integrated with the flat plate portion 121 of the shield member 12 as described above, the shell 173 of the thin wire coaxial cable 17 and the shield member 12 are electrically connected to each other when the attachment portion 175 of the thin wire coaxial cable 17 is held between the pair of clamping portions 1271 of the holding mechanism 127 of the shield member 12.

The connector 176 is formed at the one end portion of the core wire 171. The connector 176 should be connected to a corresponding connector on the circuit board of the external device provided in the separated housing. When the connector 176 is connected to the corresponding connector on the circuit board of the external device, the coaxial connection between the external coaxial cable 2 and the circuit board of the external device is provided.

Referring back to FIG. 4, the protective member 18 is a film-like member formed with an insulating material. The protective member 18 covers a solder connection provided by the solder portion 177 between the other end portion of the core wire 171 of the thin wire coaxial cable 17 and the base end portion 152 of the contact pin 15 to protect the solder connection (see FIG. 11). The protective member 18 is attached to the flange portion 132 of the shell 13 so as to cover a connection portion between the other end portion of the core wire 171 of the thin wire coaxial cable 17 and the base end portion 152 of the contact pin 15 in a state that the other end portion of the core wire 171 of the thin wire coaxial cable 17 is soldered to the base end portion 152 of the contact pin 15 through the solder portion 177. While the protective member 18 protects the connection portion between the other end portion of the core wire 171 of the thin wire coaxial cable 17 and the base end portion 152 of the contact pin 15, the protective member 18 can prevent unintentional disengagement of the solder connection between the other end portion of the core wire 171 of the thin wire coaxial cable 17 and the base end portion 152 of the contact pin 15.

FIG. 9 shows a planar view of the connector 1 having the components described above, which is viewed from the rear side. FIG. 10 shows a planar view of the connector 1 having the components described above, which is viewed from the front side. As shown in FIG. 9, the tip end portion 151 of the contact pin 15 and the main body portion 131 of the shell 13 are exposed in the opening 1131 of the engaging portion 113 on the side of the surface which should face the external coaxial cable 2. When the external coaxial cable 2 is engaged with the engaging portion 113 of the connector 1, the terminal portion 22 of the external coaxial cable 2 contacts with the contact pin 15 and the shell 13 of the connector 1 and thus the coaxial connection between the external coaxial cable 2 and the connector 1 is provided.

Further, as shown in FIG. 10, the attachment portion 175 of the thin wire coaxial cable 17 is held by the holding mechanism 127 of the shield member 12. With this configuration, it is possible to prevent the swing of the thin wire coaxial cable 17 when the vibration or the impact is applied to the connector 1 and it is possible to prevent the connection between the thin wire coaxial cable 17 and the external coaxial cable 2 and the connection between the thin wire coaxial cable 17 and the circuit board of the external device provided in the separated housing from being unintentionally disengaged. Furthermore, as described above, the shell 173 of the thin wire coaxial cable 17 and the shield member 12 are electrically connected to each other when the attachment portion 175 of the thin wire coaxial cable 17 is held by the holding mechanism 127 of the shield member 12. With this configuration, it is possible to improve the electrical characteristics of the coaxial connection provided by the connector 1.

Further, as described above, the other end portion of the core wire 171 of the thin wire coaxial cable 17 is soldered to the base end portion 152 of the contact pin 15 through the solder portion 177. Thus, it is possible to firmly connect the other end portion of the core wire 171 of the thin wire coaxial cable 17 and the base end portion 152 of the contact pin 15 as compared with a case of connecting the other end portion of the core wire 171 of the thin wire coaxial cable 17 and the base end portion 152 of the contact pin 15 with an arbitrary type of a connector. Further, since the protective member 18 covers the connection portion between the other end portion of the core wire 171 of the thin wire coaxial cable 17 and the base end portion 152 of the contact pin 15, the connection between the other end portion of the core wire 171 of the thin wire coaxial cable 17 and the base end portion 152 of the contact pin 15 becomes firmer. With this configuration, it is possible to further improve the reliability of the connection provided by the connector 1.

Further, the electrical connection provided by the connector 1 between the external coaxial cable 2 and the circuit board of the external device provided in the separated housing is the coaxial connection. As described in the section of BACKGROUND ART, the coaxial connection has high transmission performance in the high frequency band as compared with the connection using a plurality of terminals. Therefore, by providing the coaxial connection between the external coaxial cable 2 and the circuit board of the external device provided in the separated housing through the connector 1, it becomes possible to transmit a large amount of data with a low noise and short time.

FIG. 11 shows a cross-sectional view in the Y-Z plane illustrating the external coaxial cable 2 and the connector 1 in a state that the external coaxial cable 2 is attached to the connector 1. As shown in FIG. 11, the external coaxial cable 2 includes the core wire 23, an inner insulating layer 24 covering an outer surface of the core wire 23, a metal shell 25 covering an outer surface of the inner insulating layer 24 and an outer insulating layer 26 covering an outer surface of the shell 25. The core wire 23, the inner insulating layer 24 and the shell 25 constitutes a coaxial cable structure of the external coaxial cable 2. The core wire 23 and the shell 25 are electrically connected to the terminal portion 22. As shown in FIG. 11, when the external coaxial cable 2 is engaged with the engaging portion 113 of the connector housing 11 of the connector 1, the tip end portion 151 of the contact pin 15 and the main body portion 131 of the shell 13 of the connector 1 contact with the terminal portion 22 of the external coaxial cable 2. The contact pin 15 of the connector 1 is electrically connected to the core wire 23 of the external coaxial cable 2 through the terminal portion 22 of the external coaxial cable 2 and the shell 13 of the connector 1 is electrically connected to the shell 25 of the external coaxial cable 2. With this configuration, the coaxial connection between the connector 1 and the external coaxial cable 2 is provided.

In this state, when the connector 176 of the thin wire coaxial cable 17 of the connector 1 is coaxially connected to the circuit board of the external device provided in the separated housing through the connector 1, the coaxial connection between the external coaxial cable 2 and the circuit board of the external device is provided by the connector 1.

Although the connector 1 of the present invention has been described with reference to the illustrated embodiment, the scope of the present invention also involves an electronic device including the connector 1 of the present invention as described above and a circuit board provided in a housing separated from the connector housing 11 of the connector 1 and connected to the connector 1.

Although the connector and the electronic device of the present invention have been described above with reference to the embodiment shown in the accompanying drawings, the present invention is not limited thereto. Each configuration of the present invention can be replaced with any configuration capable of performing the same function or any configuration can be added to each configuration of the present invention.

A person having ordinary skills in the art and the technique pertaining to the present invention may modify the configuration of the connector of the present invention described above without meaningfully departing from the principle, the spirit and the scope of the present invention and the connector having the modified configuration is also involved in the scope of the present invention.

In addition, the number and types of the components of the connector shown in FIGS. 2 to 11 are merely provided for explaining the present invention and the present invention is not necessarily limited thereto. An aspect in which any component is added or combined or any component is omitted without departing from the principle and intent of the present invention is also involved within the scope of the present invention.

The invention claimed is:

1. A connector for providing a coaxial connection between an external coaxial cable and a circuit board provided in a separated housing located on a front side of the connector, comprising:
   a box-like connector housing to be attached to the separated housing located on the front side of the connector, the connector housing including a rear plate, a wall portion extending from an outer edge of the rear plate toward the front side and an engaging portion which is formed on a rear side surface of the rear plate and should be engaged with the external coaxial cable;
   a thin wire coaxial cable for providing the coaxial connection between the external coaxial cable engaged with the engaging portion of the connector housing and the circuit board provided in the separated housing, the thin wire coaxial cable including a core wire and a metal shell provided concentrically with the core wire; and
   a shield member which is provided in an inner space of the connector housing defined by the rear plate and the wall portion of the connector housing and electrically connected to the shell of the thin wire coaxial cable, wherein the shield member has a holding mechanism for holding the thin wire coaxial cable,
   wherein the connector further comprises a contact pin passed through the rear plate of the connector housing so that one end portion of the contact pin is located on the front side of the rear plate and the other end portion of the contact pin is located on a rear side of the rear plate,
   wherein the other end portion of the contact pin should be electrically connected to a core wire of the external coaxial cable, and
   wherein the core wire of the thin wire coaxial cable has one end portion to be connected to the circuit board and the other end portion soldered to the one end portion of the contact pin.

2. The connector as claimed in claim 1, wherein the thin wire coaxial cable has an attachment portion electrically connected to the shell, and
   wherein the shield member is electrically connected to the shell of the thin wire coaxial cable when the attachment portion of the thin wire coaxial cable is held by the holding mechanism of the shield member.

3. The connector as claimed in claim 1, wherein the shield member has a flat-plate like main body portion located on the rear plate in an internal space of the connector housing and the holding mechanism formed integrally with the main body portion.

4. The connector as claimed in claim 3, wherein the holding mechanism includes a pair of extending portions formed by bending a part of the main body toward the front side, and
   wherein the holding mechanism holds the thin wire coaxial cable by clamping an attachment portion of the thin wire coaxial cable with the pair of extending portions.

5. The connector as claimed in claim 1, wherein a connection portion between the one end portion of the contact pin and the core wire of the thin wire coaxial cable is covered by an insulating protective member.

6. An electronic device comprising:
   the connector defined by claim 1; and
   the circuit board provided in the separated housing separated from the connector housing of the connector and connected to the connector.

7. The connector as claimed in claim 1, wherein the one end portion of the core wire of the thin wire coaxial cable is connected to a second connector to be connected to a corresponding connector on the circuit board.

* * * * *